US008244910B2

(12) United States Patent
Davis

(10) Patent No.: US 8,244,910 B2
(45) Date of Patent: Aug. 14, 2012

(54) METHOD AND SYSTEM TO MODIFY FUNCTION CALLS FROM WITHIN CONTENT PUBLISHED BY A TRUSTED WEB SITE

(75) Inventor: Jeremy A. Davis, San Jose, CA (US)

(73) Assignee: eBay Inc., San Jose, CA (US)

( * ) Notice: Subject to any disclaimer, the term of this patent is extended or adjusted under 35 U.S.C. 154(b) by 1684 days.

(21) Appl. No.: 10/891,688

(22) Filed: Jul. 14, 2004

(65) Prior Publication Data

US 2006/0036746 A1 Feb. 16, 2006

(51) Int. Cl.
G06F 15/16 (2006.01)
(52) U.S. Cl. .......................... 709/246; 709/217; 715/202
(58) Field of Classification Search .................. 709/210, 709/203, 217–218, 223, 225–230, 238, 246; 715/504, 522, 524, 700, 716, 202
See application file for complete search history.

(56) References Cited

U.S. PATENT DOCUMENTS

| 5,974,549 | A | * | 10/1999 | Golan | 726/23 |
| 5,983,348 | A | * | 11/1999 | Ji | 726/13 |
| 6,055,522 | A | * | 4/2000 | Krishna et al. | 715/205 |
| 6,260,050 | B1 | * | 7/2001 | Yost et al. | 715/202 |
| 6,317,760 | B1 | * | 11/2001 | Byrd et al. | 715/237 |
| 6,341,368 | B1 | * | 1/2002 | Deans | 717/100 |
| 6,799,297 | B2 | * | 9/2004 | Ackaret | 715/222 |
| 6,826,594 | B1 | * | 11/2004 | Pettersen | 709/203 |
| 7,441,114 | B2 | * | 10/2008 | Collier et al. | 713/152 |
| 7,453,464 | B1 | * | 11/2008 | Acquavella | 345/474 |
| 2002/0174196 | A1 | * | 11/2002 | Donohoe et al. | 709/219 |
| 2004/0243570 | A1 | | 12/2004 | Gross | |
| 2005/0097566 | A1 | | 5/2005 | Watts et al. | |
| 2005/0240558 | A1 | | 10/2005 | Gil et al. | |
| 2006/0179415 | A1 | | 8/2006 | Cadiz et al. | |
| 2006/0218077 | A1 | | 9/2006 | Walker et al. | |

FOREIGN PATENT DOCUMENTS

WO WO-2008051480 A2 5/2008
WO WO-2008051480 A3 5/2008

OTHER PUBLICATIONS

"International Application Serial No. PCT/US2007/022347, Search Report mailed Jun. 5, 2008", 5 pgs.
"International Application Serial No. PCT/US2007/022347, Written Opinion mailed Jun. 5, 2008", 6 pgs.

* cited by examiner

Primary Examiner — Emmanuel L Moise
Assistant Examiner — Marie Georges Henry
(74) Attorney, Agent, or Firm — Schwegman, Lundberg & Woessner, P.A.

(57) ABSTRACT

A network-based publication system, to publish data over a communications network, includes an interface to receive, via the communications network and from a first user, user data to be published by a network-based publication system. The publication system further includes a publisher component to generate publication data (e.g., an HTML document) including the user data and function modifying code. The publisher component generates the publication data in accordance with a publication format. The interface publishes the publication data via the communications network. The function modifying code is interpreted and executed, at a browser application, to disable (or modify) least one function of programming language supported by the browser application.

30 Claims, 9 Drawing Sheets

METHOD AND SYSTEM TO MODIFY FUNCTION CALLS FROM WITHIN CONTENT PUBLISHED BY A TRUSTED WEB SITE

FIELD OF THE INVENTION

An embodiment relates generally to the technical field of electronic data access and/or publication and, in one exemplary embodiment, to a method and system to modify function calls from within content to be published by a trusted web site.

BACKGROUND OF THE INVENTION

Electronic publishing, and the provision of access to content, has been one of the driving forces behind the explosive growth of the Internet. Two examples of such electronic publishing, and data access, include (1) Internet-based commerce listings (e.g., classified advertisements, online auctions), which allow users to publish information regarding products and services for sale, and (2) web-based e-mail (e.g., HOTMAIL™ and YAHOO! MAIL) that allow people to send electronic communications to other users.

In order to increase the richness of the presentation of information accessible, and communicated, via the Internet, a number of content descriptor and programming languages have emerged to support the authoring and presentation of content, and to provide interactivity to published content. The most prominent of the descriptor languages are the so-called descriptor formats (e.g., HypeText Markup Language (HTML), eXtensible Markup Language (XML), etc.). These markup languages allow active content to be included within data to be rendered by a browser. Among the programming languages that are commonly used to provide interactivity within published content are the JAVA programming language, developed by Sun Microsystems. For example, small Java programs, commonly termed Java applets, are often referenced within published content (e.g., via a URL), and are downloaded and executed within the context of a Web browser. These Java applets can be utilized to provide interactivity and presentation richness. Similarly, an ActiveX control (authored utilizing the C++ or Java programming languages, for example) may be referenced by a web page, and downloaded for execution within the context of a Web browser.

While active content has the potential to enrich the Internet experience, it also presents a number of security problems and vulnerabilities. For example, unscrupulous and malicious users are able to include malicious content within active content of a web page. Such malicious content may, for example, take the form of a virus that infects the computer system of a user on which a web page is rendered.

Other examples of malicious active content may include a Java applet, or an ActiveX control, that harvests personal information residing on user's computer system. The threat posed by such malicious active content is particularly acute where a particular Web service receives and publishes data that may be freely authored by a user. By providing users with the ability to freely author data to be published via a Web service, the Web service is exposed to the possibility that a user may associate malicious content with the published data. While Web browsers include certain built-in safeguards to prevent malicious content from accessing personal data on a user's computer (e.g., content that originated from a specific web site (or from a specific domain) may only access cookies deposited by that web site or domain), it will be appreciated that a publishing Web service will be regarded by the browser as a trusted location, and according will allow content published by that Web service to access cookies associated with the Web service. For example, where a Web-based e-mail service deposits cookies (potentially containing confidential information) on a user's machine, content served by that Web service (e.g., a spam email) might have access to such cookies as a result of having been served from the Web service.

The combating of "malicious" active content presents significant technical challenges to the operators of web-based services. For example, a web-based e-mail service provider may be challenged to exclude malicious content from, or the disable malicious content within, e-mail communications. Similarly, the operator of a web-based commerce system may be challenged to ensure that listings, available from the commerce service provider's web site, do not contain malicious active content, or that the threat posed by the malicious content is neutralized. The technical challenges increase as the volume of communications processed by a particular web site increases.

SUMMARY OF THE INVENTION

A method to publish data over a communications network includes receiving, via the communications network and from a first user, user data to be published by a network-based publication system. Publication data is generated to include the user data and function modifying code, the publication data being generated in accordance with a publication format. The publication data is published utilizing the network-based publication system, over the communications network. The function modifying code is to modify at least one function of a programming language supported by an access application that interprets the publication data according to the publication format.

Other aspects of the invention will become apparent from the detailed description in combination with the accompanying drawings.

BRIEF DESCRIPTION OF THE DRAWINGS

The present invention is illustrated by way of example, and not limitation, in the figures of the accompanying drawings, in which like references indicate similar elements, and which.

DETAILED DESCRIPTION

A method and system to publish, or provide access to, published data over a communications network are described. In the following description, for purposes of explanation, numerous specific details are set forth in order to provide a thorough understanding of the present invention. It will be evident, however, to one skilled in the art that the present invention may be practiced without these specific details.

As noted above, one embodiment of the present invention is directed to the publication of, or provision of access to, published data by a computer system (e.g. a network-based publication system) over a communications network (e.g., the Internet). In one embodiment, the computer system may operate as a server system in a client-server environment. In other embodiments, the computer system may operate as a peer computer within a peer-to-peer architectured system. For the purpose of this specification, the term "active content" shall be taken to include any data that may cause an action or activity to occur when the active content is accessed, received or processed. For example, active content may be data that includes executable code (e.g., a script or a program) that executes responsive to an onload event. Accordingly, active content may include a markup language document (e.g., HTML, XML, etc.), in that a markup language document may cause a browser to be redirected to a storage location, and load or run applications. Active content may also include, for example, animated GIFs. Active content may also refer to markup language documents themselves (e.g., web pages that themselves include, or contain references to, an executable script, such as, for example, Java Applets, ActiveX controls, JavaScript, and Visual Basic).

Publication data (e.g., active content) may, for example, be made malicious in two manners. Firstly, a malicious component of active content may be inserted directly into the active content (e.g., as an embedded script or code). Alternatively, a malicious component of active content may be distinct from the publication data, but may be linked to the publication data (e.g., by a URL that is included within the publication data). In this case, during a so-called "onload event," a user browser application will load a web page, and the browser application will recognize the link to the malicious component of the active content. Utilizing the link, the browser application will fetch the malicious component from a location identified by the URL.

One manner in which to avoid the security risks and problems presented by active content is simply to prohibit executable code (or other varieties of active content) from being included in publication data (e.g., e-mails or listings) received at a computer system. However, this blanket approach is undesirable from a number of points of view, not the least of which is that the rich Internet experience that may be provided by active content is lost.

Figure 1:
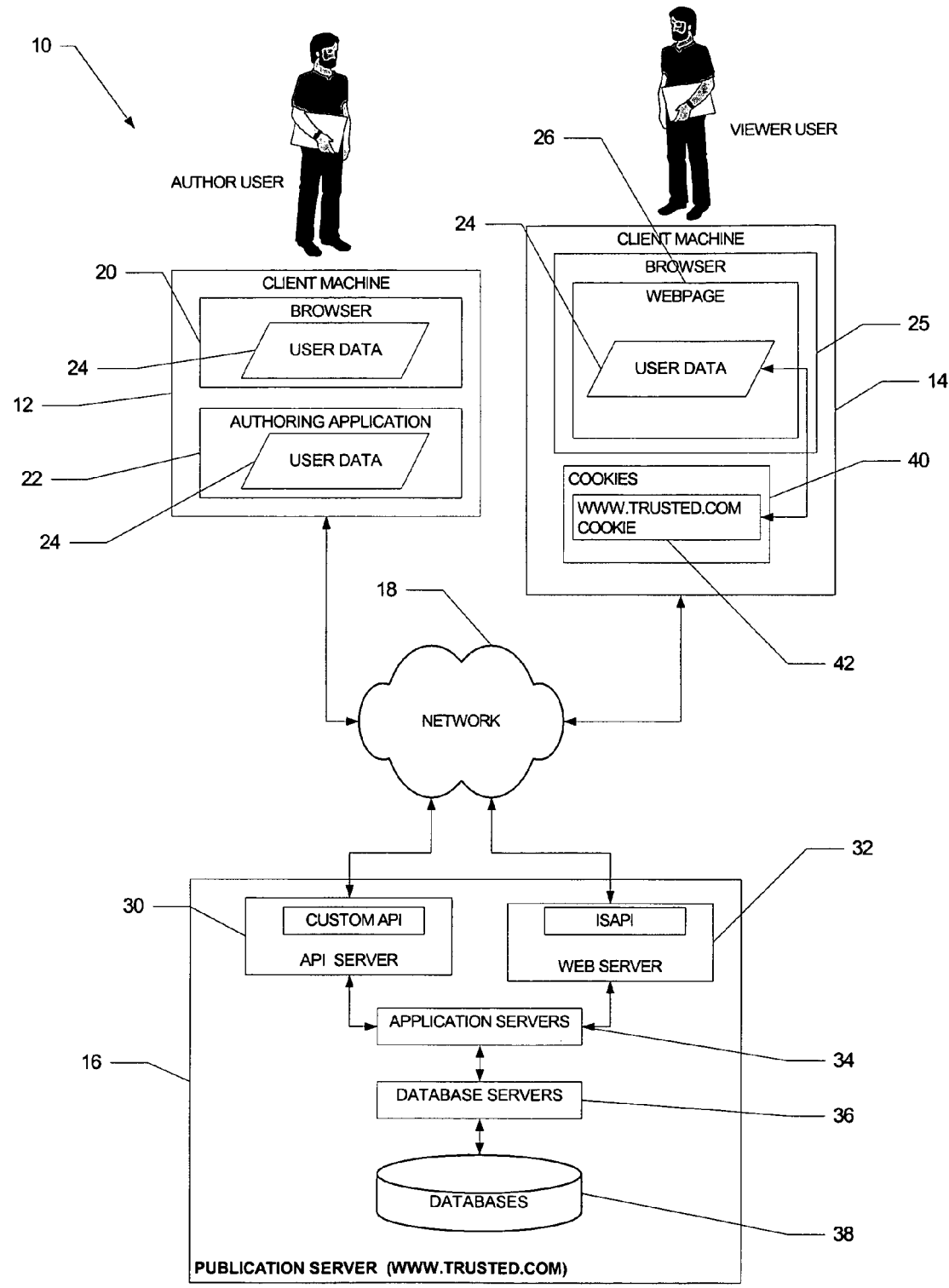
FIG. 1 is a diagrammatic representation of a network-based publication system, within which an exemplary embodiment of the present invention may be deployed.

FIG. 1 is a diagrammatic representation of a network-based publication system 10, within which an exemplary embodiment of the present invention may be implemented and/or deployed. The network-based publication system 10 may publish data, received from an author user for example, for a number of purposes. The network-based publication system 10 may support web-based email, in which case the publication data may constitute an email message communicated from an author user to a viewer user. In an alternative embodiment, the publication system 10 may support network-based commerce, with the publication data constituting a description of goods and/or services being offered for sale, for example by an author user. In this embodiment, the publication data would then be published to potential buyers, who then constitute viewer users. Of course, there are numerous other examples of publication systems 10 (e.g., web-based blogs, web page hosting services etc.) within which embodiments of the present invention may be deployed.

Referring now specifically to FIG. 1, an author user operates a client machine 12 so as to enable the publication of data to a viewer user who operates a further client machine 14. Both the client machines 12 and 14 are coupled to a network-based publication server 16, in the exemplary form of a publishing website (e.g., www.trusted.com), via a network 18 (e.g., the Internet).

Referring specifically to the client machine 12 associated with the author user, the client machine 12 is shown to host a browser application 20 and/or an authoring application 22, each of which may be utilized by the author user to create publication data, in an exemplary form of user data 24. For example, the publication server 16 may host an authoring application for which interfaces, in the form of web pages, are communicated via the network 18 for display within the browser application 20. The hosted authoring application may facilitate the authoring of the user data 24 by the author user.

The authoring application 22 constitutes a client-side application (e.g., an email client or a listing-generation application) that assists the author user in generating the user data 24.

User data 24 is communicated, via the network 18, to the publication server 16, where it is stored and included in publication data, in the exemplary form of a web page 26, that is generated by the publication server 16 and communicated to the client machine 14, associated with the viewer user. The client machine 14 is also shown to host a browser application 25, which renders the received web page 26, including user data 24 included therein.

The publication server 16 includes two interfaces, in the respective forms of an Application Program Interface (API) server 30 and a web server 32. The API server 30 communicates via the network 18 with other machines utilizing a custom API, while the web server 32, in the exemplary embodiment, is shown to communicate with other machines, via the network 18, utilize the Internet Server API, which is an API developed by MICROSOFT CORPORATION. Accordingly, the custom API and the ISAPI are examples of interfaces to the publication server 16.

The API server 30 and web server 32 are coupled to one or more application servers 34, which may host any one of a number of applications to provide services supported by the publication server 16. For example, where the publication server 16 supports a web-based email service, one or more email applications may be hosted on the application servers 34. Where the publication server 16 supports a network-based commerce service, the application servers 34 may host a number of marketplace and/or payment applications. The application servers 34 are in turn coupled to one or more database servers 36, which facilitate access by the application servers 34 to one or more databases 38.

As noted above, the publication server 16, in the exemplary embodiment, receives the user data 24 generated by the author user. This user data 24 is stored, and then published to the viewer user, for example, within the context of a web page 26. The services supported by the publication server 16 may make it advantageous to allow the author user to freely include active content within the user data. For example, where the publication server 16 supports a network-based commerce service, the author user, as a seller, may wish to include active content within the user data 24 so as to make the user data visually appealing. Further, the author user may wish to include active content within the user data 24 to add certain functionality (e.g., an access count function provided by a counter) to the user data 24 when the publication server 16 publishes it. In short, in order to promote adoption of services supported by the publication server 16, an operator of the publication server 16 may wish to allow author users a certain degree of freedom regarding the inclusion of active content within the user data 24.

However, in allowing author users this freedom, certain security risks may be presented. For example, a malicious author user may include active content within the user data 24 that executes and performs malicious activities on the client machine 14 of the viewer user when rendered by the browser application 25. For example, malicious active content may infect the client machine 14 with a virus, damage or disrupt data stored by the client machine 14, or retrieve and communicate personal data of the viewer user, stored on the client machine 14, to the malicious author user.

To appreciate one example of such a security risk, consider that many websites deposit so-called "cookies" on a client machine that accesses the website. These cookies may be used for numerous purposes, including allowing a website to identify a particular client machine operated by a user, and to thus prevent the user from continually having to perform login operations with respect to the website. Websites often further store certain confidential information (e.g., usernames and passwords) within the cookie, so as to enable the website to automatically retrieve this information upon an access request from the client machine. This is advantageous in that it reduces the need for a user to provide this information each time the website is accessed. Browser applications provide a level of security with respect to information included in cookies, in that only an access request from a domain (e.g., "trusted.com") may access cookies that were stored on the client machine 14 from that particular domain. Accordingly, where a user is logged into another domain (e.g., "untrusted.com"), a machine operating at this further domain will not be able to access a cookie deposited from the "trusted.com" domain.

Referring back to FIG. 1, it will be appreciated that the user data 24 is published by the publication server 16 on behalf of the authoring user, and will have accordingly originated from a domain (e.g., "trusted.com") associated with the publication server 16. Accordingly, active content and scripts within the user data 24 will not be prevented, by the browser application 25, from accessing cookies deposited by the publication server 16 on the client machine 14. Accordingly, FIG. 1 shows user data 24, on the client machine 14, accessing a cookie associated with the "trusted.com" domain, as deposited by the publication server 16. This scenario presents certain security risks as the usernames/password, and other confidential information, pertaining to the publication server 16 may be contained within the cookie 42, associated with "trusted.com" domain. The cookie 42 is shown to form part of a collection of cookies 40 stored on the client machine 14.

Figure 2:
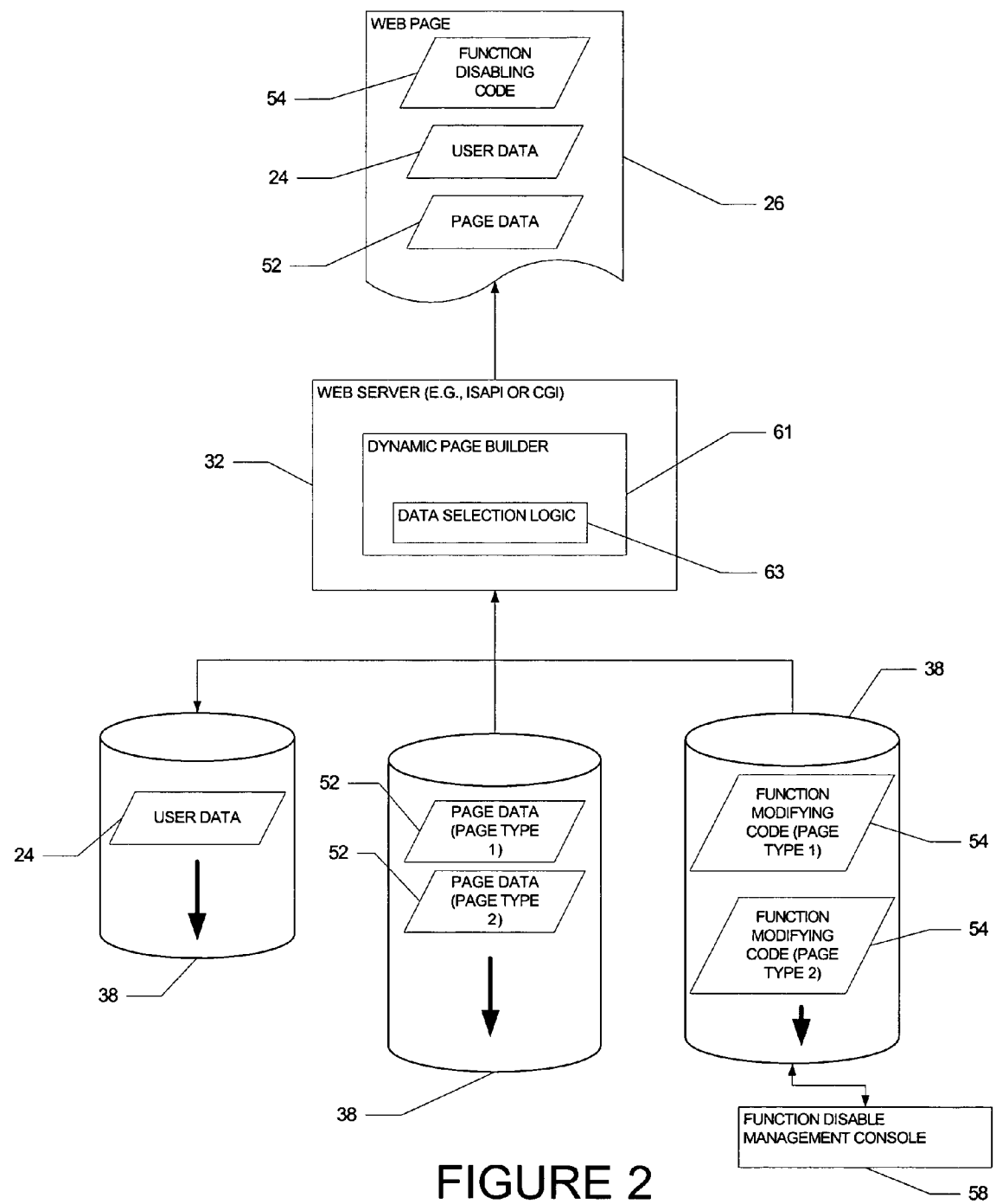
FIG. 2 is a block diagram illustrating the generation of publication data, in the exemplary form of a web page, according to one embodiment.

FIG. 2 is a block diagram illustrating further architectural details regarding 13 a network-based publication system to publish data over a communications network. Specifically, FIG. 2 shows that the databases of the publication server 16 store the user data 24 (e.g., an email, a listing, a blog entry, etc.), page data 52 that the publication server 16 may include in a webpage (e.g., headers, footers and ancillary information to be published in conjunction with the user data 24), and function modifying code 54. The function modifying code 54, in one embodiment, is to modify at least one function of a programming language supported by an access application, in the exemplary form of a browser application. As will be described in further detail below, the function modifying code 54 may operate to disable (or at least neutralize undesirable capabilities of) certain default functions, supported by a browser application and that render a client machine 14 vulnerable to malicious active content and code included within the user data 24.

It would also be noted that page data 52 for multiple page types may be stored within the databases 38, the page data 52 for each of the page types being specific to the layout and content of a particular page. For example, a first instance of the page data 52, associated with a home page type, may be different from the page data 52 associated with a listing page type within the context of a network-based commerce service. Similarly, the databases 38 may store multiple instances of function modifying code 54, each of these instances being associated with a corresponding instance of the page data 52. For example, a particular page type may exhibit vulnerability as a result of a particular default function in a programming language. Accordingly, the functions that the modifying code 54 disables may be specific to a particular page type. Accordingly, in one embodiment, each instance of the function modifying code 54 may operate to modify (e.g., disable) a unique set of functions of a particular programming language (e.g., the Java).

The web server 32, shown in FIG. 2, includes a dynamic page builder 61 that retrieves data from the databases 38, and assembles this data into publication data (e.g., a web page 26) that is then transmitted from the publication server 16, via the network 18, to a client machine for rendering and display by a browser application. The dynamic page builder 61 includes data selection logic 63, which operates to select data from the databases 38 for inclusion within publication data, in the exemplary form of the web page 26. For example, where the web page 26 is generated a responsive to a request, directed to a network-based commerce service, for publication data pertaining to a particular item, the data selection logic 63 operates to select the appropriate user data 24, the appropriate page data 52, and the appropriate function modifying code 54 for inclusion within the generated web page 26.

A function modify management console 58 enables security personnel that operate the publication server 16 conveniently to author and manage the various instances of function modifying code 54 stored within the databases 38. For example, as the security personnel become aware of new types of threats, the function modify management console 58 enables the security personnel to update the function modifying code 54 to counter such newly identified risks and threats.

Figure 3:
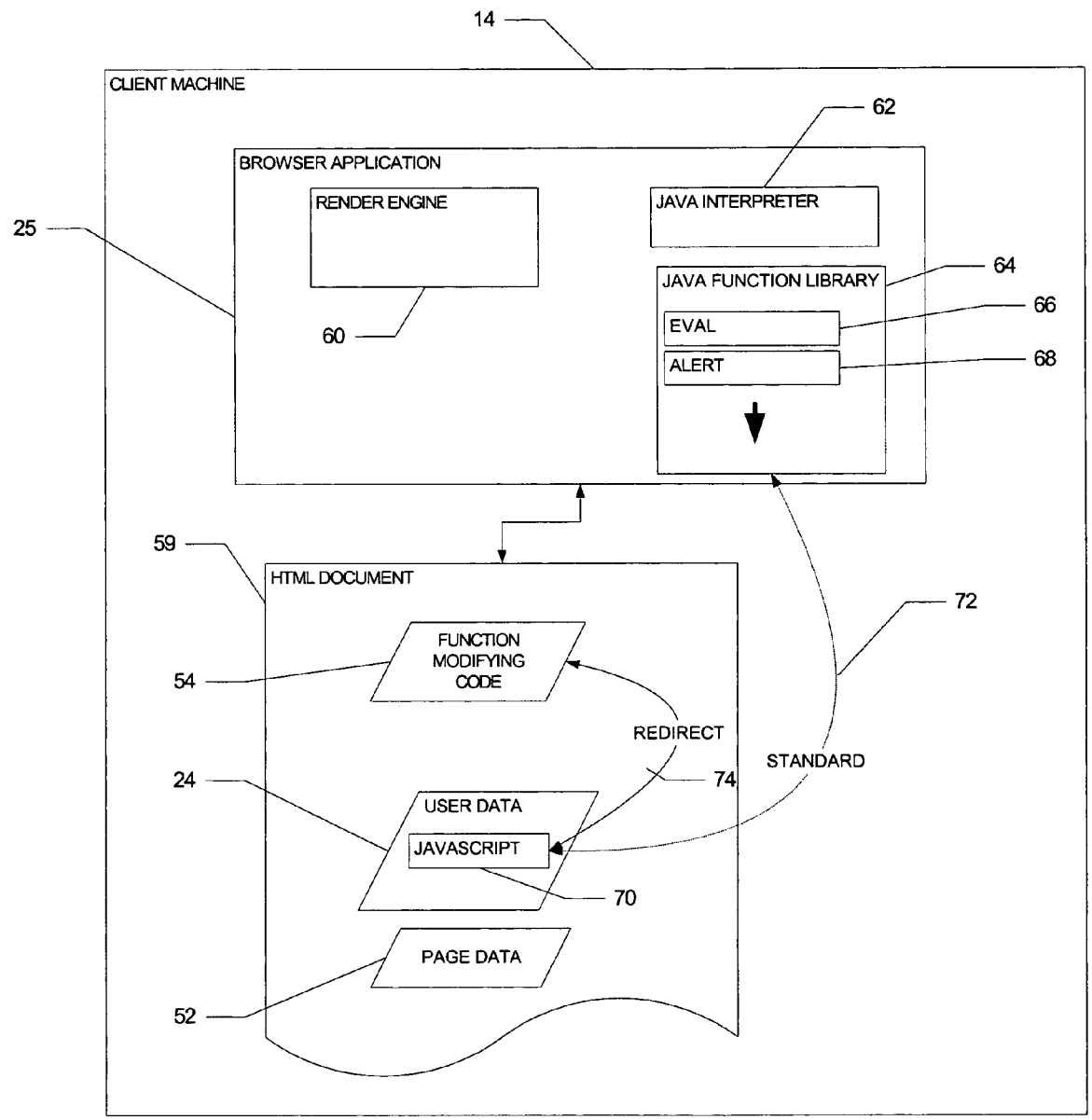
FIG. 3 is a block diagram illustrating how function-modifying code, included within publication data, is utilized to redirect function calls from a script included in a web page, according to an exemplary embodiment.

FIG. 3 is a block diagram illustrating how the function modifying code 54, embedded in the web page 26 by the web server 32, may be utilized to modify at least one function of a programming language supported by an access application, in the exemplary form of a browser application 25.

The browser application 25 is shown to include a render engine 60 (e.g., the MICROSOFT INTERNET EXPLORER or the APPLE SAFARI render engine), which is responsible for the interpretation of descriptor tags within a marker-language document (e.g., an HTML document) so as to render the document as a web page. The browser application 25 also includes an interpreter, in the exemplary form of a Java interpreter 62, that operationally interprets Java code included within an HTML document. Of course, a number of other interpreters may also be included within, or associated with, the browser application 25.

The Java interpreter 62 has access to a collection of functions, in the exemplary form of a Java function library 64. Accordingly, Java code interpreted by the interpreter 62 may make a function call to any one of a number of standard (or default) functions provided within the Java function library 64. For the purposes of illustration, two functions provided by a standard Java function library 64 will be discussed below, namely EVAL (or evaluation) function 66 and ALERT function 68.

FIG. 3 illustrates that the user data 24, in an exemplary instance, includes executable code in the exemplary form of the JavaScript 70. The JavaScript 70, when encountered by the render engine 60, invokes the Java interpreter 62. The JavaScript 70 may make one or more function calls for services provided by a standard (or default) functions that form part of the Java function library 64. Accordingly, FIG. 3 indicates the JavaScript 70 as making a function call to a "standard" function within the library 64 in broken line 72.

To appreciate how certain standard function calls within the Java function library 64 may pose a security risk, some explanation regarding filtering techniques that may be employed by a publication server 16, and the obfuscation techniques employed by malicious users to avoid these filtering techniques, is warranted. Continuing the above example of the security risk provided by "cookies" deposited on to a client machine, JavaScript enables a malicious user to grab a reference to a user's cookie by including the function call "document.cookie" in the JavaScript. A publication server 16 typically employs sophisticated filters (not shown) that are utilized to detect strings within user data 24 that are recognized as being malicious. For example, a simple filter would be employed by the publication server 16 to detect any occurrences of the string "document.cookie", and to take appropriate action on the detection of such a string (e.g. the user data 24 may be stripped of such string, or publication of the user data 24 may be blocked). In order to avoid detection of strings of malicious code within user data 24 received at the publication server 16, malicious users use a number of sophisticated obfuscation techniques to disguise strings of malicious code, thereby to avoid detection by filters. The above-described EVAL function 66 is one example of a function that may be utilized to obfuscate a malicious string. Specifically, the EVAL function 66 enables the interpretation of dynamically built string data into a code. An EVAL statement can be used as follows:

eval ("ale"+"rt(doc"+"ument.cook"+"ie);");

This statement would prompt a box that exposes a user's cookies. It will be appreciated from the above example that the string "document.cookie" has been disguised within the context of an EVAL statement, and that the offending string is dynamically built when encountered within the JavaScript. It will also be appreciated that the variations and permutations that a malicious user could deploy to disguise are numerous. Accordingly, any string matching filter which looks for malicious code like "cookie", "document", etc. can potentially be subverted, utilizing the EVAL function.

Having now explained how certain standard functions provided by programming languages supported by a browser application 25 may be utilized to obfuscate malicious code, a description is provided below of how function modifying code 54 may be utilized to selectively modify (e.g. disable) certain standard functions, while allowing other functions, that are typically not utilized for obfuscation purposes, to remain fully available to executable code that may be included within the user data 24. Certain programming languages, including the Java programming languages, enable functions to be defined or declared. Accordingly, in one embodiment, the function modifying code 54 may constitute function declarations that override a standard, or built in, function of a programming language. Accordingly, by declaring these functions anew and in a manner that they are rendered unsuitable for malicious purposes, the malicious use of such standard functions is avoided, according to one exemplary embodiment. The below exemplary function modifying code 54 provides an example of how the EVAL and WRITE functions, provided as standard functions within a Java function library 64, may be modified by being re-declared in a manner that makes them unsuitable for malicious purposes. In the below exemplary function modifying code 54, the relevant functions are redefined to simply perform no operations. However, in alternative embodiments, it will be appreciated that the functions may be re-defined to perform certain functions, but not perform other functions that enable code obfuscation.

```
//Override functions
function docEval( ) { }
function docWrite( ) { }
function docElem( ) { return null; }
function overrideFunctions( )
{
    document.getElementById = docElem;
    document.write = docWrite;
    window.eval = docEval;
}
```

The above exemplary function modifying code 54 operates to reassign the standard EVAL function to a new "dummy" EVAL function, and the standard EVAL functionality on the relevant HTML document is disabled.

As mentioned above, the function modifying code 54 may modify a standard function of the Java function library 64 by simply disabling the function. In another embodiment, the function modifying code 54 may modify a standard function of the Java function library 64 to perform an alternative function that does not provide the obfuscation capabilities that may be present in the unmodified standard function, but that nonetheless provides functionality that may be useful to an operator of the publication server 16. For example, the below exemplary script redefines a "document.write" function to provide an alert regarding malicious code detected within user data 24:

```
<script>
document.oldDocWrite = document.write;
function myDocWrite(pStr)
{
        if (pStr.indexOf("malicious code") > −1)
            alert("blocking string: '" + pStr + "'");
        else
            document.oldDocWrite(pStr);
}
document.write = myDocWrite;
var str = "<b>Hello</b>";
```

-continued

```
document.write(str);
str = "This is malicious code!";
document.write(str);
    </script>
```

FIG. 3 illustrates that the function called by the JavaScript 70 is redirected from the Java function library 64 to the function modifying code 54, this redirection being indicated by arrow 74. Specifically, upon encountering the JavaScript 70 within the user data 24, the Java interpreter 62 will issue a function call to the re-defined function, as defined within the function modifying code 54, as opposed to issuing a function call to the standard function within the Java function library 64.

In this manner, it will be appreciated that, by including appropriate function modifying code 54 within publication data, the publication server 16 can selectively disable, or alternatively modify, operations performed as a result of the executable code included within the user data 24. The ability to selectively disable, or modify, such function calls is valuable to an operator of the publication server 16, as the operator can allow function calls to a standard set of functions provided by a programming language, while neutralizing (e.g., by selectively disabling) obfuscation capabilities inherent in the standard set of functions.

Figure 4:
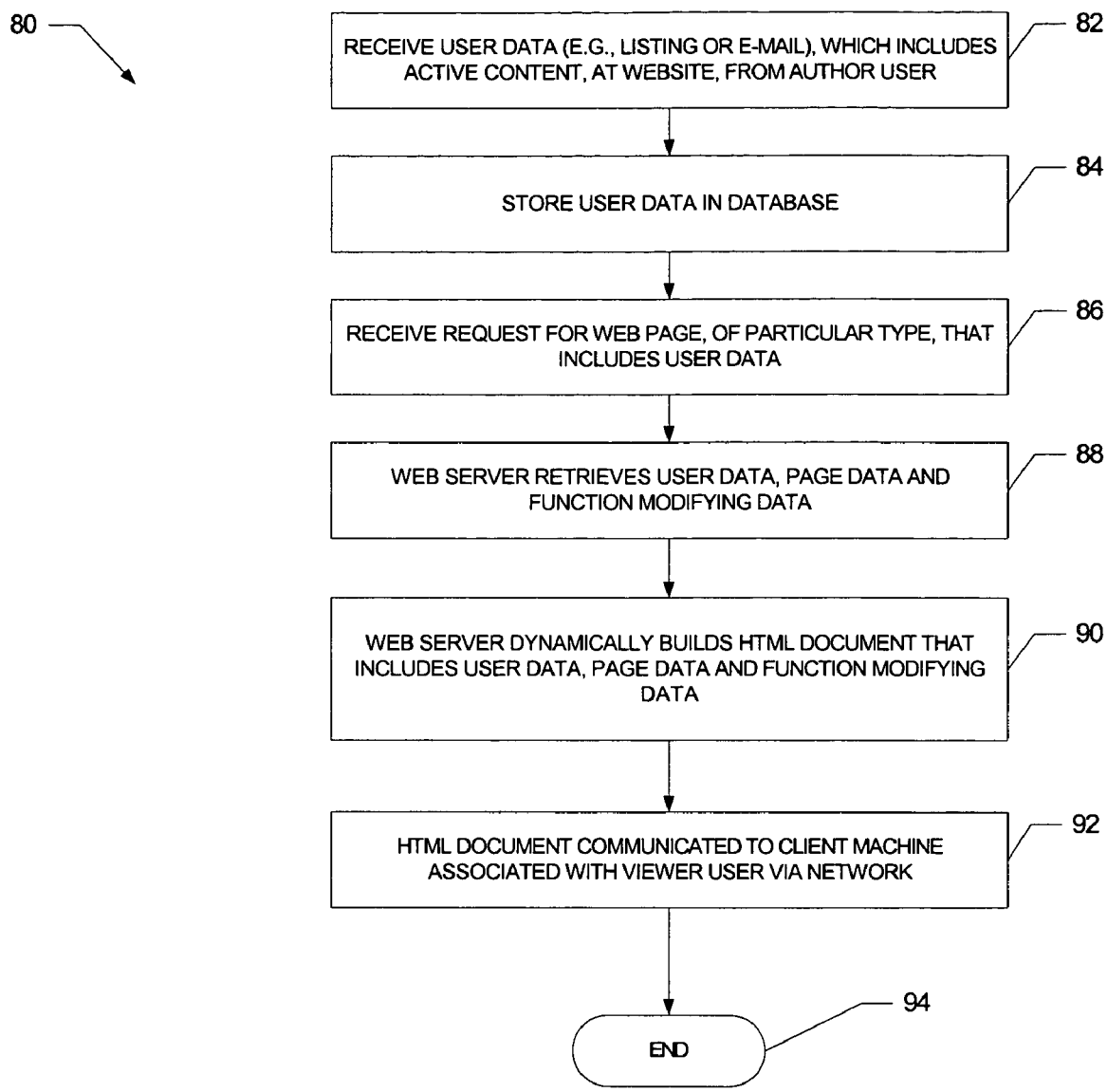
FIG. 4 is a flowchart illustrating a method, according to exemplary embodiment, to publish data over a communications network from a network-based publication system to a client machine, according to an exemplary embodiment.

FIG. 4 is a flowchart illustrating a method 80, according to an exemplary embodiment of the present invention, to publish data, over a communications network (e.g., the Internet) from a network-based publication system to a client machine. The method 80 commences at block 82 with the receipt of user data 24 at the publication server 16, whereafter the user data 24 is stored (block 84) within a database 38 associated with the publication server 16.

At block 86, a request is received from a client machine 14 associated with a viewer user for a web page of a particular type, which includes user data 24. For example, the request may be from a viewer user to a web-based email service to view an email addressed to the viewer user. Alternatively, the request may be to view a listing page, providing details regarding an item or a service offered for sale, via a network-based commerce service. In this example, the type of web page requested may be a listing web page, as opposed to a search result page or a home page.

At block 88, the web server 32, responsive to the request received at block 86, retrieves appropriate user data 24, page data 52, and function modifying code 54. At block 88, in one exemplary embodiment, the page data 52 and the function modifying data 54 retrieved by the web server 32 may be selected by the data selection logic 63 based on the page type that has been requested.

At block 90, the dynamic page builder 61 of the web server 32 dynamically builds publication data, in the exemplary of an HTML document, which includes the retrieved user data 24, page data 52 and function modifying code 54. At block 92, the HTML document is communicated from the web server 32 to the requesting client machine 14, associated with the viewer user, via the network 18. Upon receipt of the HTML document, the browser application 25, resident on the client machine 14, renders the HTML document 59, as described above with reference to FIG. 3, to present a web page to the user. In this rendering process, the function modifying code 54 will serve to disable, or modify, function calls that may be utilized for obfuscation or other malicious purposes. The method 80 then ends at block 94.

Figure 5:
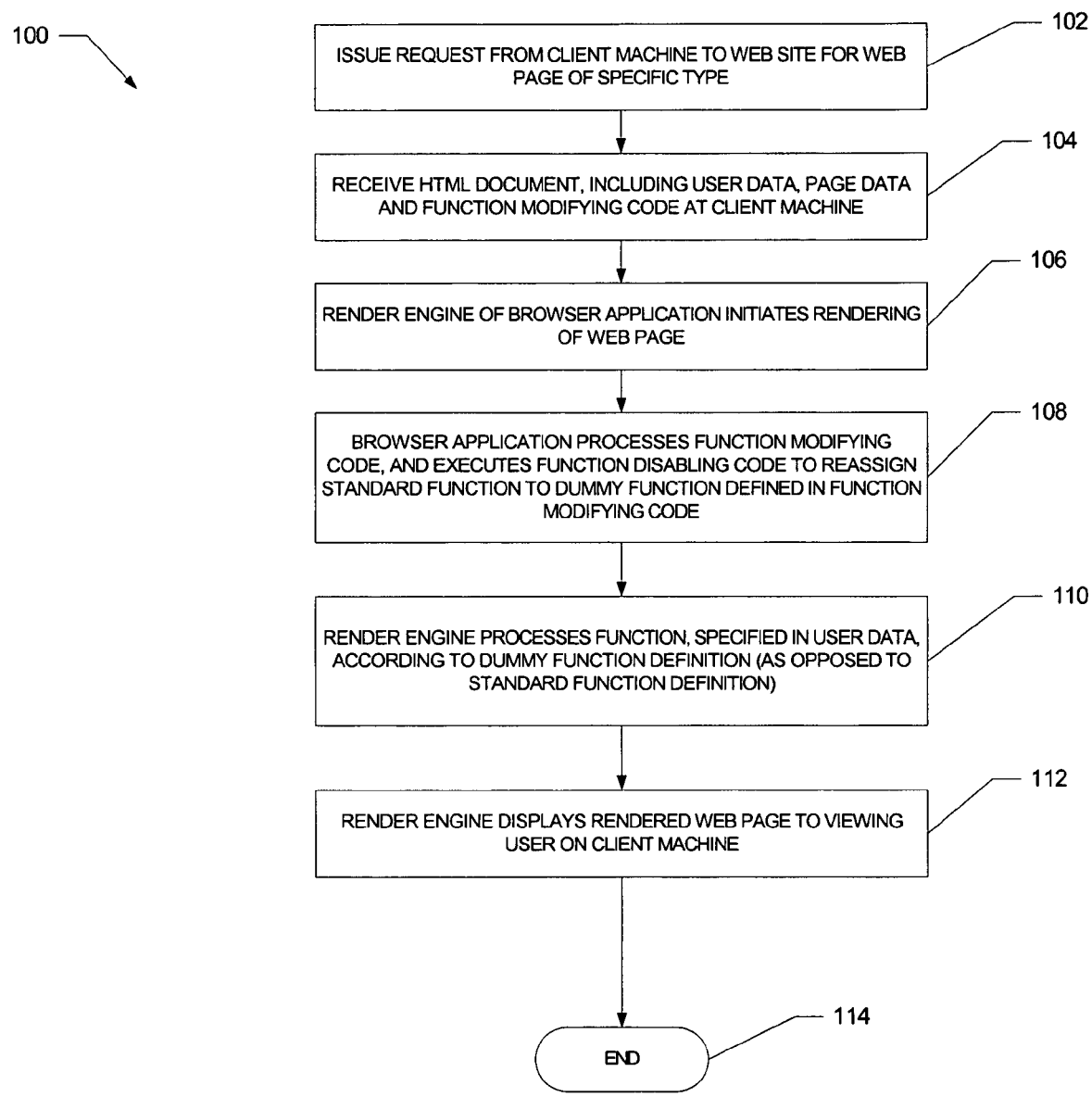
FIG. 5 is a flowchart illustrating a method, according to exemplary embodiment, to process publication data within the context of a browser so that function calls from a script within the publication data are redirected from a default set of functions provided in a function library, according to an exemplary embodiment.

The method 80 described above with reference to FIG. 4 provides a description of operations performed a computer system operating in the capacity of a publication server 16. FIG. 5 is a flowchart illustrating a method 100, according to an exemplary embodiment, to process publication data within the context of an access application (e.g., a browser application) so that function calls from executable code within the publication data are redirected from a default set of functions provided by a programming language to re-defined functions. The operations performed in the method 100, in one exemplary embodiment, are performed on a computer system accessed by a viewer user, this computer system operating in the capacity of a client machine or, in an alternative embodiment as a peer to a publishing computer system.

The method 100 commences at block 102 with the issuance of a request from the client machine 14 to a web site, supported by the publication server 16, for a web page of a specific type.

At block 104, the HTML document, generated by the publication server 16 responsive to the request, is received at the client machine 14 and specifically by the browser application 25 resident on the client machine 14. At block 106, the render engine 60 of the browser application 25 initiates rendering of the web page utilizing the received HTML document.

At block 108, the render engine 60 of the browser application 25 encounters the function modifying code 54 within the received HTML document, and invokes the Java interpreter 62 to execute the function modifying code 54. Execution of the function modifying code 54 by the Java interpreter 62 operates, as described above, to reassign certain standard functions, provided by the Java function library 64, to "dummy" functions that are defined within the function modifying code 54. In one embodiment, the function modifying code 54 is included within a document initialization layer of the HTML document, to ensure that the reassignment of the functions occurs prior to any rendering of content included within the HTML document.

At block 110, the render engine 60 then proceeds to render the content of the HTML document, including the user data 24. Upon encountering JavaScript 70 within the user data 24, the render engine 60 will invoke the Java interpreter 62. The Java interpreter 62 in turn, upon encountering a function call within the JavaScript 70, will process the JavaScript 70 in accordance with whether the relevant function has been re-declared (or redefined) by the function modifying code 54. For example, where a function call is to a standard function in the function library 64 that has not been re-declared within the function modifying code 54, this function call will be handled by the Java interpreter 62 in the normal manner, with the function call being serviced out of the function library 64. On the other hand, should the function have been re-declared (or re-assigned) in the function modifying code 54, the function call will be handled as specified in the function modifying code 54.

At block 112, the render engine 60 completes rendering of the HTML document, and presents the resulting web page to the viewing user via the client machine 14. The method 100 then ends at block 114.

Figure 6:
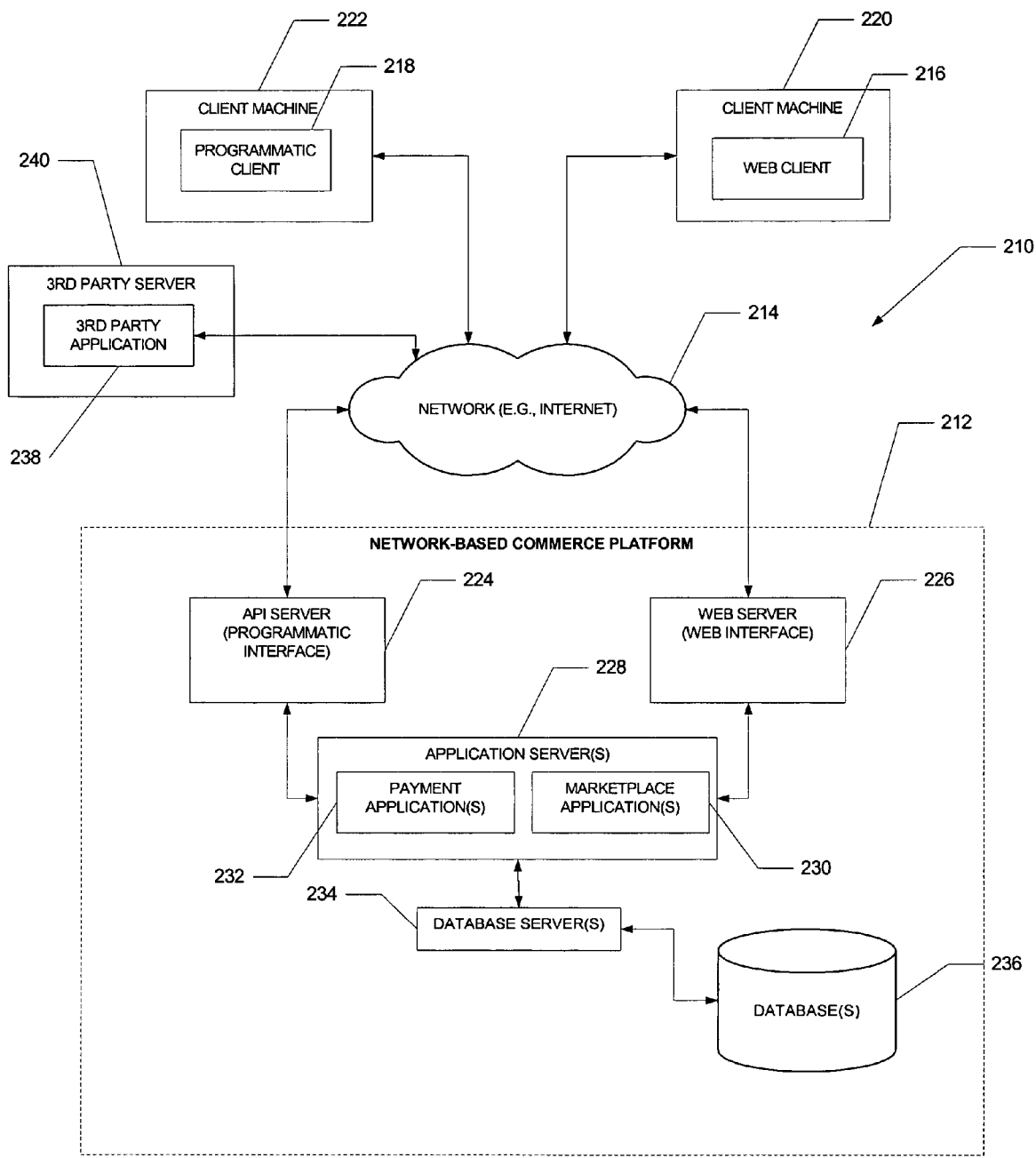
FIG. 6 is a network diagram depicting a commerce system, according to an exemplary embodiment, having a client-server architecture.

FIG. 6 is a block diagram depicting network-based publication system, in the exemplary form of a commerce system 210. An exemplary embodiment of present invention may be deployed a within the context of such a commerce system 210. FIG. 6 illustrates, for example, a web client 216 (e.g., a browser, such as the INTERNET EXPLORER browser developed by MICROSOFT CORPORATION of Redmond, Wash. State), and a programmatic client 218 executing on respective client machines 220 and 222.

Turning specifically to the network-based marketplace 212, an Application Program Interface (API) server 224 and a web server 226 are coupled to, and provide programmatic and web interfaces respectively to, one or more application servers 228. The application servers 228 host one or more marketplace applications 230 and payment/redemption applications 232.

The application servers 228 are, in turn, shown to be coupled to one or more database servers 234 that facilitate access to one or more databases 236.

The marketplace applications 230 provide a number of promotional, loyalty and marketplace functions and services to user that access the marketplace 212. The payment/redemption applications 232 likewise provide a number of payment and redemption services and functions to clients that access marketplace 212. Specifically, the payment/redemption applications 230 allow users to quantify for, and accumulate, value in accounts, and then later to redeem the accumulated value for products (e.g., goods or services) that are made available via the marketplace applications 230. While the marketplace and payment/redemption applications 230 and 232 are shown in FIG. 6 to both form part of the network-based marketplace 212, it will be appreciated that, in alternative embodiments, the payment/redemption applications 232 may form part of a promotion or loyalty service that is separate and distinct from the marketplace 212.

Further, while the system 210 shown in FIG. 6 employs a client-server architecture, the present invention is of course not limited to such an architecture, and could equally well find application in a distributed, or peer-to-peer, architecture system. The various marketplace and payment applications 230 and 232 could also be implemented as standalone software programs, which do not necessarily have networking capabilities.

The web client 216, it will be appreciated, accesses the various marketplace and payment/redemption applications 230 and 232 via the web interface supported by the web server 226. Similarly, the programmatic client 218 accesses the various services and functions provided by the marketplace and payment/redemption applications 230 and 232 via the programmatic interface provided by the API server 224. The programmatic client 218 may, for example, be a seller application (e.g., the TURBO LISTER application developed by EBAY INC., of San Jose, Calif.) to enable sellers to author and manage listings on the marketplace 212 in an off-line manner, and to perform batch-mode communications between the programmatic client 218 and the network-based marketplace 212.

FIG. 6 also illustrates a third party application 238, executing on a third party server machine 240, as having programmatic access to the network-based marketplace 212 via the programmatic interface provided by the API server 224. For example, the third party application 238 may, utilizing information retrieved from the network-based marketplace 212, support one or more features or functions on a website hosted by the third party. The third party website may, for example, provide one or more promotional, marketplace or payment/redemption functions that are supported by the relevant applications of the network-based marketplace 212.

Figure 7:
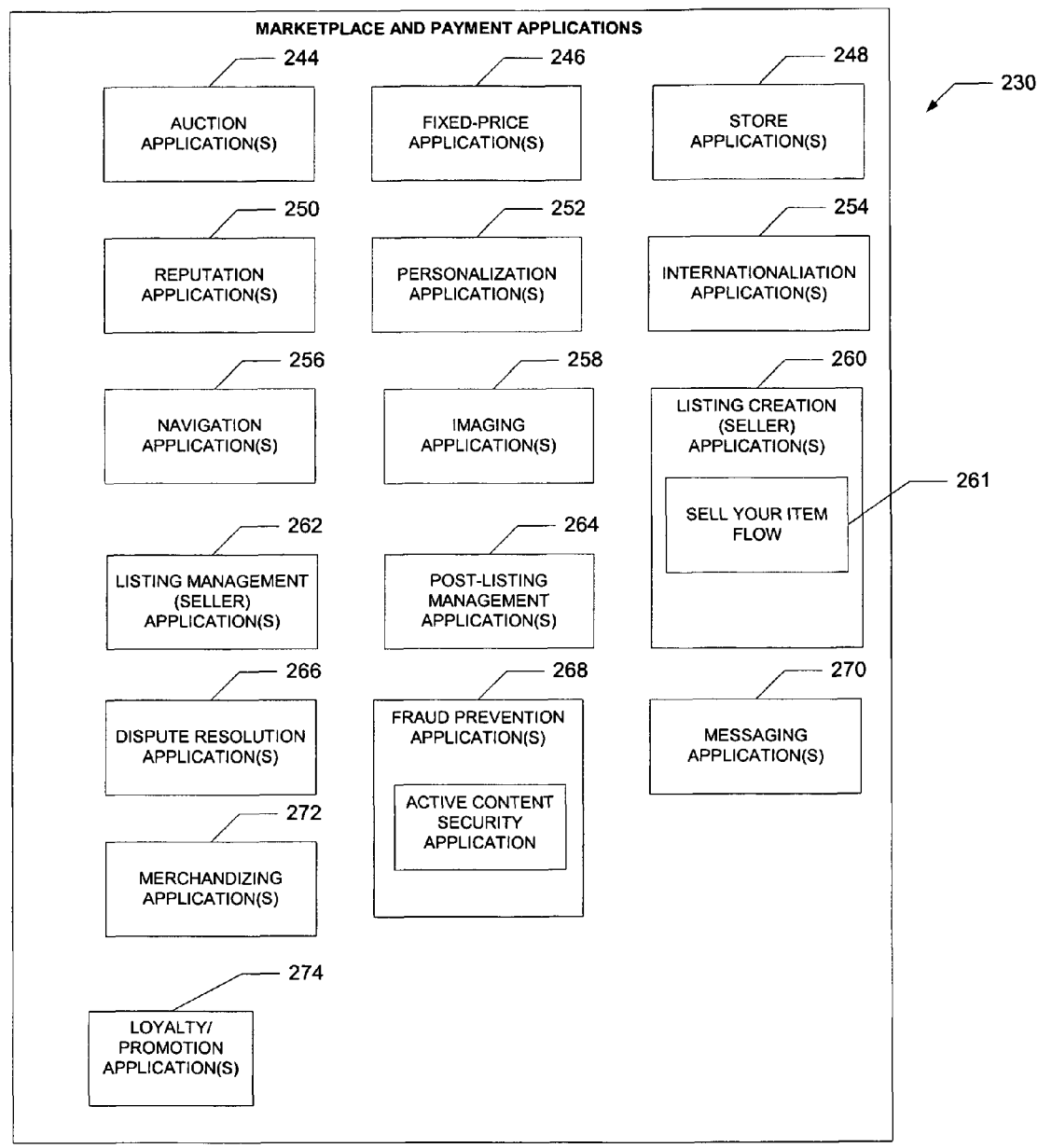
FIG. 7 is a block diagram illustrating multiple marketplace and payment applications that, in one exemplary embodiment, are provided as part of a network-based marketplace.

FIG. 7 is a block diagram illustrating multiple marketplace and promotional applications 230 that, in one exemplary embodiment, are provided as part of the network-based marketplace 212. The marketplace 212 may provide a number of listing and price-setting mechanisms whereby a seller can list goods or services for sale, a buyer can express interest in or indicate a desire to purchase such goods or services, and a price can be set for a transaction pertaining to the goods or services. To this end, the marketplace applications 230 are shown to include one or more auction applications 244 with support auction-format listings and price setting mechanisms (e.g., English, Dutch, Vickrey, Chinese, Double, Reverse auctions etc.). The various auction applications 244 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 246 support fixed-price listing formats (e.g., the traditional classified advertisement-type listing or a catalogue listing) and buyout-type listings. Specifically, buyout-type listings may be offered in conjunction with an auction-format listing, and allow a buyer to purchase goods or services, which are also being offered for sale via an auction, for a fixed-price which is typically higher than the starting price of the auction.

Store applications 248 allow sellers to group their listings within a "virtual" store, which may be branded and otherwise personalized by and for the sellers. Such a virtual store may also offer promotions, incentives and features that are specific and personalized to a relevant seller.

Reputation applications 250 allow parties that transact utilizing the network-based marketplace 212 to establish, build and maintain reputations, which may be made available and published to potential trading partners. Specifically, where the network-based marketplace 212 supports person-to-person trading, parties to a transaction may have no history or other reference information whereby trustworthiness and credibility may be ascertained. The reputation applications 250 allow a party, for example through feedback provided by other transaction partners, to establish a reputation over time within the network-based marketplace 212. Other potential trading partners may then reference such a reputation for the purposes of assessing credibility and trustworthiness.

Personalization applications 252 allow users of the marketplace 212 to personalize various aspects of their interactions with the marketplace 212. For example a user may, utilizing an appropriate personalization application 252, create a personalized reference page at which information regarding transactions to which the user has been a party may be viewed. Further, a personalization application 252 may enable a user to personalize listings and other aspects of their interactions with the marketplace 212 and other parties.

In one embodiment, the network-based marketplace 212 may support a number of marketplaces that are customized, for example for specific geographic regions. A version of the marketplace 212 may be customized for the United Kingdom, whereas another version of the marketplace 212 may be customized for the United States. Each of these versions may operate as an independent marketplace, or may be customized (or internationalized) presentations of a common underlying marketplace.

Navigation of the network based-marketplace 212 may be facilitated by one or more navigation applications 256. For example, a search application enables key word searches of listings published via the marketplace 212. A browse application allows users to browse various category, or catalogue, data structures according to which listings may be classified within the marketplace 212. Various other navigation applications may be provided to supplement the search and browsing applications.

In order to make listings available via the network-based marketplace 212 as visually informing and attractive as possible, the marketplace applications 230 may include one or more imaging applications 258 utilizing which users may upload images for inclusion within listings. An imaging application 258 also operates to incorporate images within viewed listings. The imaging applications 258 may also support one or more promotional features, such as image galleries that may be presented to potential buyers. For example, sellers may pay an additional fee to have an image associated with one or more of the listings included within a gallery of images for promoted items.

Listing creation applications 260 allow sellers conveniently to author listings pertaining to goods or services that they wish to transact via the marketplace 212, and listing management applications 262 allow sellers to manage such listings. Specifically, where a particular seller has authored and/or published a large number of listings, the management of such listings may present a challenge. The listing management applications 262 provide a number of features (e.g., auto-relisting, inventory level monitors, etc.) to assist the seller in managing such listings. One or more post-listing management applications 264 also assist sellers with a number of activities that typically occur post-listing. For example, upon completion of an auction facilitated by one or more auction applications 244, a seller may wish to leave feedback regarding a particular buyer. To this end, a post-listing management application 264 may provide an interface to one or more reputation applications 250, so as to allow the seller conveniently to provide feedback regarding multiple buyers to the reputation applications 250.

Dispute resolution applications 266 provide mechanisms whereby disputes that may arise between transacting parties may be resolved. Specifically, the dispute resolution applications 266 may provide guided procedures whereby the parties are guided through a number of steps in an attempt to settle the dispute. In the event that the dispute cannot be settled via the guided procedures, the dispute may be escalated to a third party mediator or arbitrator.

A number of fraud prevention applications 268 implement various fraud detection and prevention mechanisms to reduce the occurrence of fraud within the marketplace 212. The fraud prevention applications 268 are also shown to include, in one embodiment, an active content security application.

Messaging applications 278 are responsible for the generation and delivery of messages to users of the network-based marketplace 212, such messages for example advising users regarding the status of listings at the marketplace 212 (e.g., providing "outbid" notices to bidders during an auction process or to provide promotional and merchandising information to users).

Merchandising applications 280 support various merchandising functions that are made available to sellers to enable sellers to increase sales via the marketplace 212. The merchandising applications 280 also operate the various merchandising features that may be invoked by sellers, and may monitor and track the success of merchandising strategies employed by sellers.

The network-based marketplace 212 itself, or one or more parties that transact via the marketplace 212, may operate loyalty programs that are supported by one or more loyalty/promotions applications 282. For example, a buyer may earn loyalty or promotions points for each transaction established and/or concluded with a particular seller via the marketplace 212, and be offered a reward for which accumulated loyalty points can be redeemed. A user may also accumulate value in forms other than points. For example, value may be accumulated through coupons, gift certificates, etc.

The loyalty/promotion applications 282 include at least one accumulation module 284 that is responsible for registering the accumulation of value (e.g., points, coupons, gift certificates) within the accounts of users, and a redemption module 286 that is responsible for the redemption of accumulated value by users. Each of the accumulation and redemption modules 284 and 286 is shown to include a verification process, a lookup process, and an update process. The loyalty/promotion applications 282 also include a statistics module 288 that, as will be described in further detail below, is responsible for the generation of statistics pertaining to reward activities or events that may be registered with the loyalty/promotion applications 282.

Figure 8:
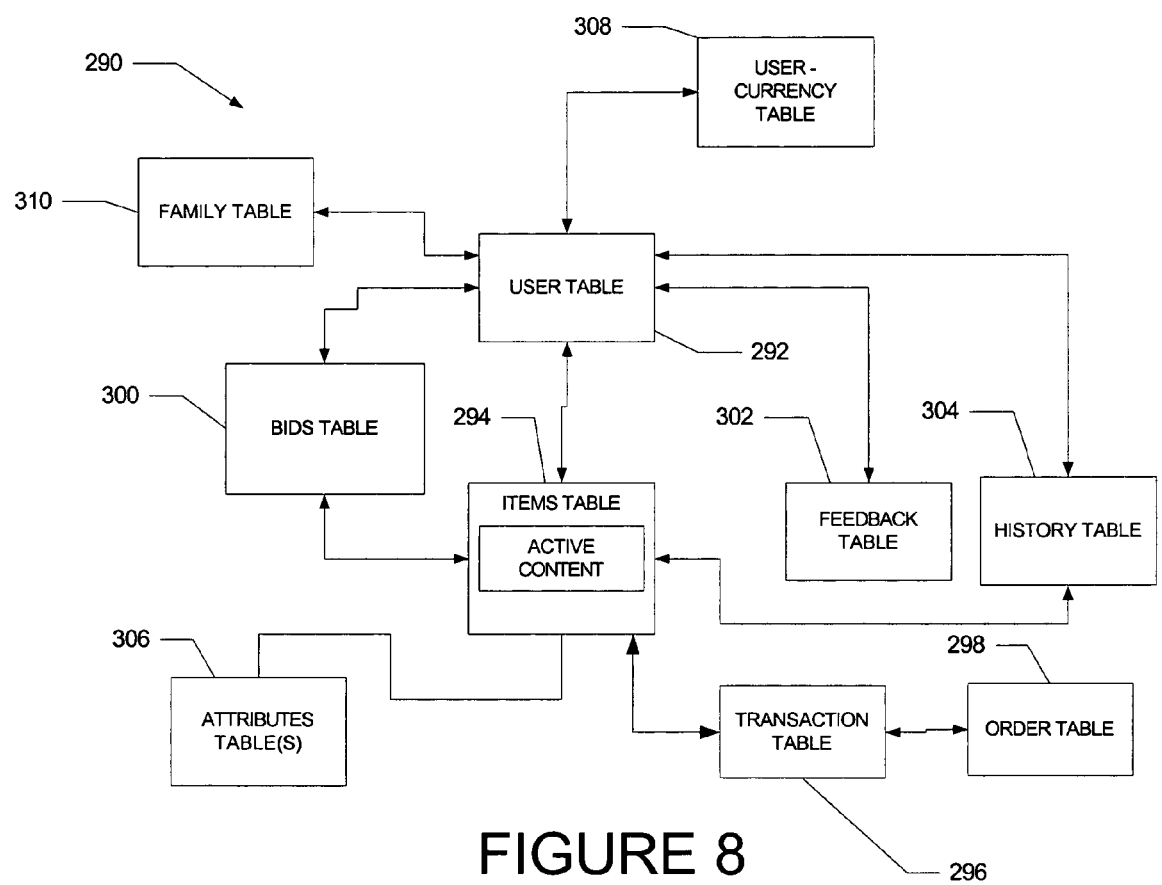
FIG. 8 is an entity-relationship diagram illustrating various tables that may be maintained within a database, according to one exemplary embodiment, that supports a network-based marketplace.

FIG. 8 is an entity-relationship diagram, illustrating various tables 290 that may be maintained within the databases 236, and that are utilized by and support the marketplace 212 and payment/redemption applications 230 and 232. A user table 292 contains a record for each registered user of the network-based marketplace 212, and may include identifier, address and financial instrument information pertaining to each such registered user. A user may, it will be appreciated, operate as a seller, a buyer, or both, within the network-based marketplace 212. In one exemplary embodiment of the present convention, a buyer may be a user that has accumulated value (e.g., promotional or loyalty points, coupons, gift certificates), and is then able to exchange the accumulated value for items that are offered for sale by the network-based marketplace 212.

The tables 290 also include an items table 294 in which is maintained an item record for each item or service that is available to be, or has been, transacted via the marketplace 212. Each item record within the items table 294 may furthermore be linked to one or more user records within the user table 292, so as to associate a seller and one or more actual or potential buyers with each item record. In one exemplary embodiment, certain of the items for which records exist within the items table 294 may be promotional (or loyalty) items for which promotional or loyalty points (or other accumulated value) can be exchanged by a user. Any one or more of item records within the items table 294 may include active content, and accordingly be analyzed and verified by the active content security application, according to an exemplary embodiment.

A transaction table 296 contains a record for each transaction (e.g., a purchase transaction) pertaining to items for which records exist within the items table 294.

An order table 298 is populated with order records, each order record being associated with an order. Each order, in turn, may be with respect to one or more transactions for which records exist within the transactions table 296.

Bids records within a bids table 300 each relate to a bid receive at the network-based marketplace 212 in connection with an auction form of listing supported by an auction application 244. A feedback table 302 is utilized by one or more reputation applications 250, in one exemplary embodiment, to construct and maintain reputation information concerning users. A history table 304 maintains a history of transactions to which a user has been a party. One or more attributes tables 306 record attribute information pertaining to items for which records exist within the items table 294. Considering only a single example of such an attribute, the attributes tables 306 may indicate a currency attribute associated with a particular item.

Figure 9:
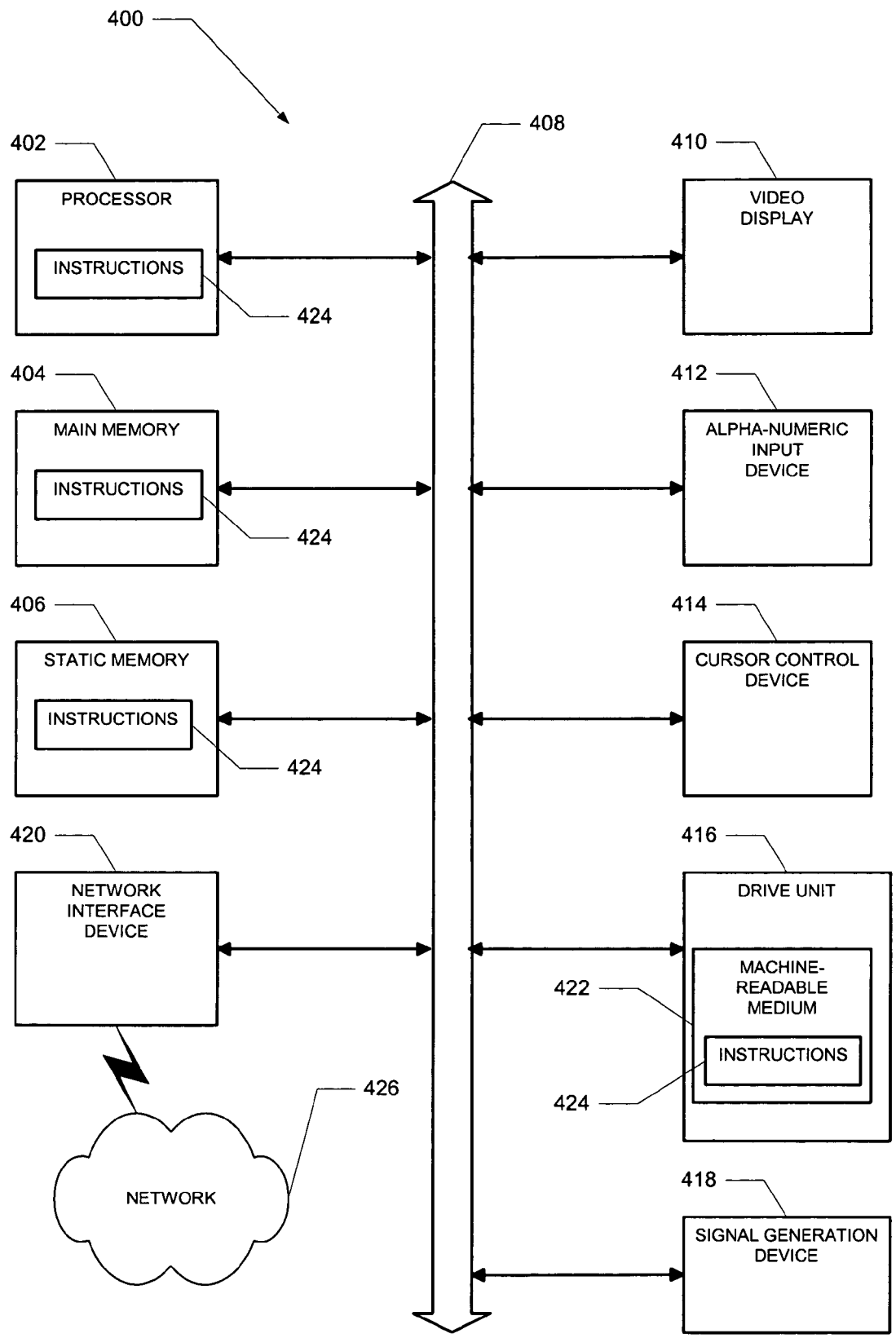
FIG. 9 is a diagrammatic representation of a machine, in the exemplary form of a computer system, within which a set of instructions for causing the machine to perform any one of the methodologies discussed herein may be executed.

FIG. 9 shows a diagrammatic representation of machine in the exemplary form of a computer system 400 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system to publish data over a communications network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A network-based publication system to publish data over a communications network, the system including:
an interface to receive, via a communications network and from a first user, user data to be published by the network-based publication system, the user data including a function call to at least one function of a programming language;
a publisher to generate publication data including the user data and function modifying code, the publisher to generate the publication data in accordance with a publication format;
wherein the interface is to communicate the publication data via the communications network, and wherein the function modifying code is to redefine a standard function definition of the at least one function of the programming language for security reasons and is supported by an access application that interprets the publication data according to the publication format and wherein the interface is to receive a publication request from a second user, the publisher is to generate the publication data responsive to the publication request received from the second user via the communications network for a specific publication; and
the system including a selector to select the function modifying code from a plurality of function modifying codes based on the specific publication, the plurality of function modifying codes being stored within a database of the network-based publication system.

2. The system of claim 1, wherein the at least one function enables construction of a string that constitutes executable code.

3. The system of claim 1, wherein the user data is associated with executable code.

4. The system of claim 3, wherein the user data includes the executable code.

5. The system of claim 3, wherein the user data includes a reference to executable code stored at a further location accessible via the communications network.

6. The system of claim 1, wherein the publication format is a markup-language document format.

7. The system of claim 1, wherein the programming language is the JavaScript programming language.

8. The system of claim 1, wherein the access application includes an interpreter to interpret the executable code in accordance with the programming language.

9. The system of claim 8, wherein the access application supports a library of functions made available by the programming language.

10. The system of claim 1, wherein the access application includes a render engine to render the publication data according to the publication format.

11. The system of claim 1, wherein the access application is a web browser.

12. The system of claim 1, wherein the publisher is to generate the publication data to include publisher data associated with the network-based publication system.

13. The system of claim 1, wherein each function modifying code of the plurality of function modifying codes is operatively to modify a unique set of functions of the programming language.

14. The system of claim 1, wherein the function modifying code is to disable a capability of the at least one function of the programming language.

15. A method to publish data over a communications network, the method including:
receiving, via a communications network and from a first user, user data to be published by a network-based publication system, the user data including a function call to at least one function of a programming language;
generating publication data to include the user data and function modifying code, the publication data being generated in accordance with a publication format, wherein the function modifying code is to redefine a standard function definition of the at least one function of the programming language for security reasons and is supported by an access application that interprets the publication data according to the publication format;

receiving a publication request from a second user, via the communications network, for a specific publication;

selecting the function modifying code from a plurality of function modifying codes based on the specific publication, the plurality of function modifying codes stored within a database of the network-based publication system; and responsive to the publication request from a second user, publishing the publication data, utilizing the network-based publication system, over the communications network.

16. The method of claim 15, wherein the at least one function enables construction of a string that constitutes executable code.

17. The method of claim 15, wherein the user data is associated with executable code.

18. The method of claim 17, wherein the user data includes a reference to executable code stored at a further location accessible via the communications network.

19. The method of claim 15, wherein the user data includes the executable code.

20. The method of claim 15, wherein the publication format is a markup-language document format.

21. The method of claim 15, wherein the programming language is the JavaScript programming language.

22. The method of claim 15, wherein the access application includes an interpreter to interpret the executable code in accordance with the programming language.

23. The method of claim 22, wherein the access application supports a library of functions made available by the programming language.

24. The method of claim 15, wherein the access application includes a render engine to render the publication data according to the publication format.

25. The method of claim 15, wherein the access application is a web browser.

26. The method of claim 15, wherein the publication data is generated to include publisher data generated by the network-based publication system.

27. The method of claim 15, wherein each function modifying code of the plurality of function modifying codes is operatively to modify a unique set of functions of the programming language.

28. The method of claim 15, wherein the function modifying code is to disable a capability of the at least one function of the programming language.

29. A network-based publication system to publish data over a communications network, the system including:

first means for receiving, via a communications network and from a first user, user data to be published by the network-based publication system, the user data including a function call to at least one function of a programming language; and second means for generating publication data including the user data and function modifying code, the second means for generating the publication data in accordance with a publication format;

third means for receiving a publication request from a second user, via the communications network, for a specific publication;

fourth means for selecting the function modifying code from a plurality of function modifying codes based on the specific publication, the plurality of function modifying codes stored within a database of the network-based publication system; and wherein the first means is for communicating the publication data via the communications network, and wherein the function modifying code is for redefining a standard function definition of the at least one function of the programming language for security reasons and is supported by an access application that interprets the publication data according to the publication format.

30. A non-transitory machine-readable medium storing a set of instructions that, when executed by a machine, cause machine to perform a method to publish data over a communications network, the method including:

receiving, via a communications network and from a first user, user data to be published by a network-based publication system, the user data including a function call to at least one function of a programming language;

generating publication data to include the user data and function modifying code, the publication data being generated in accordance with a publication format, wherein the function modifying code is to redefine a standard function definition of the at least one function of the programming language for security reasons and is supported by an access application that interprets the publication data according to the publication format;

receiving a publication request from a second user, via the communications network, for a specific publication;

selecting the function modifying code from a plurality of function modifying codes based on the specific publication, the plurality of function modifying codes stored within a database of the network-based publication system; and responsive to the publication request from a second user, publishing the publication data, utilizing the network-based publication system, over the communications network.

* * * * *